United States Patent [19]
Kelpin et al.

[11] Patent Number: 5,775,073
[45] Date of Patent: Jul. 7, 1998

[54] RAKE COMPACTOR AND HELICAL PADDLE WHEEL FOR AQUATIC HARVESTER

[76] Inventors: Thomas G. Kelpin, deceased, late of Shreveport, La.; by Margaret L. Kelpin, administratrix, 2045 Bert Kouns, Apt. 228, Shreveport, La. 71118

[21] Appl. No.: 728,327

[22] Filed: Oct. 9, 1996

[51] Int. Cl.⁶ .................................................. A01D 44/00
[52] U.S. Cl. ............................ 56/8; 56/9; 56/153; 56/194
[58] Field of Search ........................... 56/8, 9, 1, 156, 56/153, 131, 192, 193, 194

[56] References Cited

U.S. PATENT DOCUMENTS

| | | |
|---|---|---|
| Re. 995 | 7/1860 | Jane . |
| 5,000 | 3/1847 | Gold . |
| 18,694 | 11/1857 | Jane . |
| 179,521 | 7/1876 | Cauthorn . |
| 640,344 | 1/1990 | Williams . |
| 1,820,866 | 8/1931 | Bruguiere . |
| 3,449,892 | 6/1969 | Huff ............................... 56/9 |
| 3,890,771 | 6/1975 | Kelpin ............................ 56/9 |
| 4,248,033 | 2/1981 | Bryant ........................ 56/9 X |
| 4,507,909 | 4/1985 | Kelpin ........................... 56/9 |
| 5,069,023 | 12/1991 | Prochaska, Sr et al. ....... 56/9 |

*Primary Examiner*—Terry Lee Melius
*Attorney, Agent, or Firm*—John M. Harrison

[57] ABSTRACT

A rake compactor and helical paddle wheel system for an aquatic harvester, the rake compactor of which includes a carriage or trolley movably and horizontally mounted by means of rollers on rails above the deck of the aquatic harvester and characterized by a dual endless chain drive system for selectively moving the trolley forwardly and rearwardly above the deck and a rake pivoted to the trolley for engaging, loading, compacting and unloading aquatic growth harvested by the aquatic harvester and deposited on the harvester deck. Dual, independently driven, helical paddle wheels serve to drive and maneuver the aquatic harvester.

17 Claims, 4 Drawing Sheets

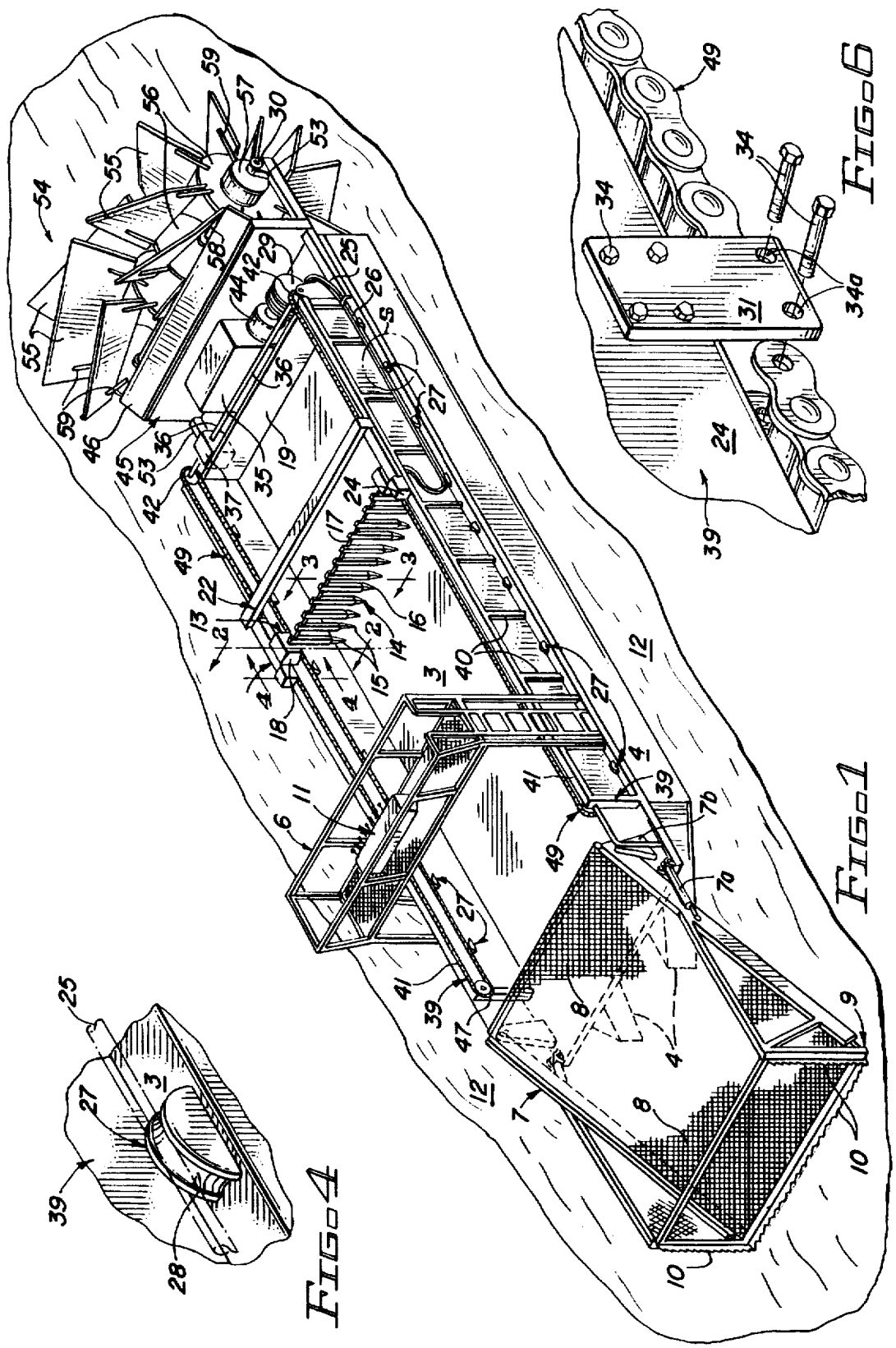

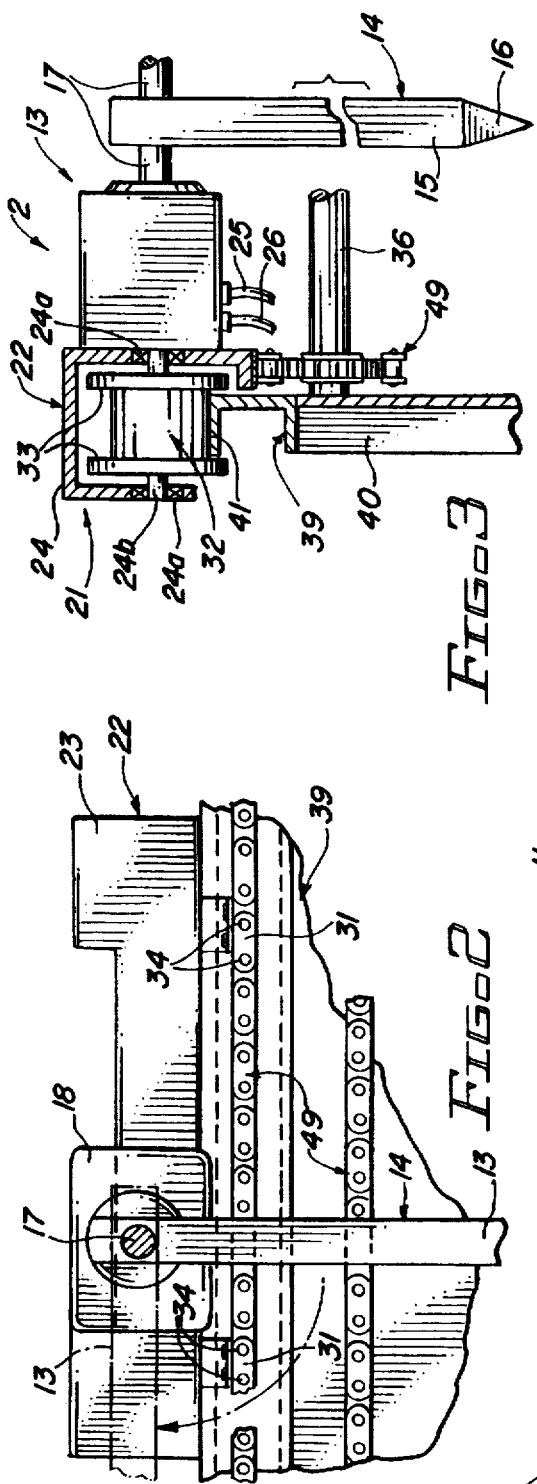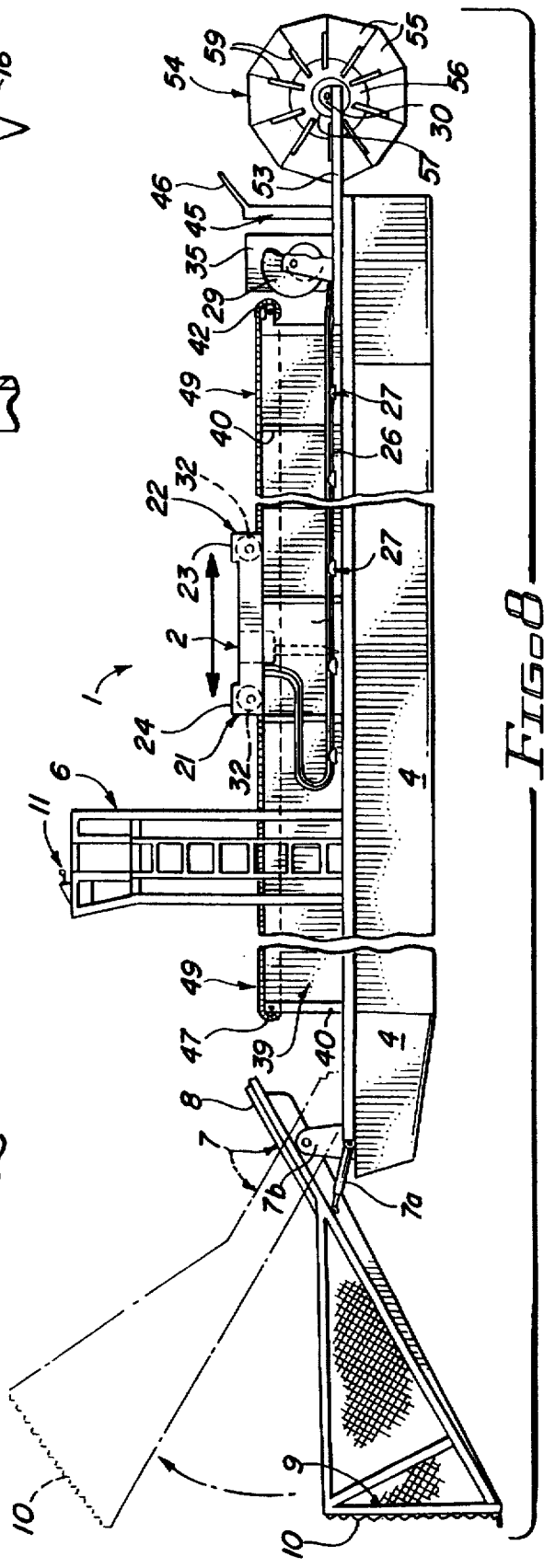

RAKE COMPACTOR AND HELICAL PADDLE WHEEL FOR AQUATIC HARVESTER

BACKGROUND OF THE INVENTION

1. Field of the Invention

This invention relates to apparatus for harvesting aquatic growth from rivers and lakes and more particularly, to a new and improved dual, endless chain-driven rake compactor and helical paddle wheel mechanism for cutting, loading, compacting, redistributing and unloading aquatic growth which has been harvested and deposited on the deck of an aquatic harvester, and maneuvering and driving the aquatic harvester, respectively. The aquatic harvester employing the compactor and helical paddle wheel system of this invention is able to float and maneuver in all types of water bodies, including lakes, ponds, rivers and canals. The harvester is designed to mechanically cut, load, compact and unload both bottom-rooted and floating aquatic growth of any description and to collect debris, such as trash and wood, as well as dead animals and fish. When cut by a system of cutter bars or engaged while floating, the aquatic vegetation is loaded by conveyor belt onto the harvester deck, where the compacting mechanism compacts the mass for efficient storage. The dual, independently-operated, helical paddle wheels facilitate operation in thick aquatic growth and/or shallow water. The compactor mechanism of this invention includes a carriage or trolley fitted with rollers designed to traverse a pair of parallel rails elevated from the deck of the aquatic harvester, by operation of a dual, parallel, endless chain drive system, in order to relocate and compact aquatic growth deposited on the deck by a cutter blade and conveyor belt harvesting system. The rake further includes multiple, spaced, downwardly-extending tines or teeth attached to a mount bar secured in a shaft which engages a hydraulic gear box and motor, for selectively pivoting the teeth downwardly to engage the aquatic vegetation and upwardly to clear the vegetation and relocate the trolley. Alternatively, a one-piece rake member can be provided on the mount bar for engaging the aquatic growth. The teeth or one-piece rake member are designed to selectively engage and disengage the harvested aquatic plants by operation of hydraulic controls located in a wheelhouse elevated from the harvester deck. In a preferred embodiment, the dual helical paddle wheels are each separately driven by a pair of low-speed, high-torque hydraulic motors mounted on a pair of corresponding paddle wheel shafts, each of which shafts receives a pair of spaced blade drums, to which the helical blades are attached by means of blade supports. The paddle wheels are rotatably secured to the aquatic harvester and are independently driven in either direction by operation of the hydraulic motors, responsive to manipulation of corresponding hydraulic controls.

A growing problem which has become more and more acute around the world is that of the proliferation of aquatic growth and vegetation in inland streams, lakes, rivers and other waterways. This problem is intensified due to the increasing use of commercial fertilizers which enter the waterways as run-off from rainfall or irrigation. This factor, coupled with the runoff and deposition of human and animal waste into such waterways, provides a fertile environment for the rapid growth of both floating and bottom-rooted vegetation, which eventually chokes and closes the waterways. A controlled quantity of such vegetation, such as the water hyacinth, is ecologically essential to a balanced, healthy water system, since it acts as a natural cleansing agent by absorbing pollutants in the water and serves as a habitat for a variety of aquatic life. However, when the vegetation reaches a level of overgrowth, it can literally destroy the waterway environment and reduce the efficiency of the waterway for commerce and recreation.

There are very few areas in the world which are not faced with an expanding aquatic vegetation growth problem that results in loss of water efficiency through evaporation, loss of water storage capacity, reduction of water delivery rates and damage and fouling of pumping systems, as well as loss of recreation and navigation area. Although various chemicals such as herbicides can eliminate many species of aquatic growth, the chemicals also pollute the water, poisoning fish or rendering the fish inedible and creating additional problems. Controlled vegetation harvesting is necessary to promote healthy water and retain a selected quantity of plants to provide a filter which absorbs toxic elements and food and shelter for marine life.

There are two primary methods of controlling the overproliferation of aquatic vegetation. The first and currently most often used technique is chemical control by application of herbicides. Herbicides are quick, effective, easily obtained and at the outset, seem currently to be cost effective. The second most common technique for controlling the growth of aquatic plants and vegetation in waterways is by mechanically harvesting the vegetation. Techniques for mechanical harvesting vary from the use of small, open bow boats for manually removing the plants, to larger aquatic harvesting machines which are designed to cut the plants and load them for future disposal. Mechanical harvesting is a safe method of plant control which results in less impact on the environment than the use of herbicides. It is also non-polluting, selective in the amount and type of plant life removed and in the long run, less costly than the repeated use of herbicides. More importantly, it provides a means for reclaiming the harvested vegetation, which can be used for a variety of purposes.

2. Description of the Prior Art

As described above, prior art techniques for removing aquatic growth and vegetation from lakes, streams, rivers, reservoirs and other waterways include the use of chemicals and mechanical harvesting. Of the two techniques, mechanical harvesting is more ecologically attractive, since it is nonpolluting and can be used to selectively remove desired varieties and quantities of aquatic vegetation and leave other vegetation to act as natural filters and shelter for marine life. Typical of the prior art patented mechanical aquatic harvesters is the "Aquatic Harveter" detailed in U.S. Pat. No. 3,698,163, dated Oct. 17, 1972, to Thomas G. Kelpin. This harvester is characterized by pontoons secured to a flat deck member and propelled and steered by an above-the-water air propulsion system. The harvester includes a self-unloading conveyor system, a cutter bar assembly designed for cutting underwater weed growth and a three-phase electrical power system for operating the various sub-assemblies. The machine is capable of carrying aquatic vegetation loads in excess of ten tons, with a draft of approximately fifteen inches of water. U.S. Pat. No. 3,890,771, dated Jun. 24, 1973, also to Thomas G. Kelpin, discloses an "Improved Aquatic Harvester" having multiple pontoons secured below a flat deck member, a plant pickup assembly mounted on the forward end of the craft to collect aquatic material and an above-the-water propulsion and steering system, including an air propulsion unit. The pontoons are each characterized by at least one closed, integrally formed, buoyant capsule constructed of a plastic material. U.S. Pat. No. 3,847,105, entitled "Aquatic Harvester" dated Nov. 12, 1974, to Thomas G. Kelpin, discloses a similar mechanical harvesting device with an above-the-water air propulsion system. U.S. Pat. No. 4,507,909, dated Apr. 2, 1985, also to Thomas G. Kelpin, details a "Compactor and Paddle Wheel For Aquatic Harvester". The device includes a carriage movably mounted by means of rollers on the deck of an aquatic harvester and driven by a single serpentine chain drive system for selectively moving the carriage forwardly and rearwardly with respect to the deck. A rake is pivoted to the carriage for engaging, relocating, compacting and unloading aquatic growth harvested by the aquatic harvester and deposited on the harvester deck. Dual, independently driven paddle wheels include rotating drums shaped by multiple drum panels and spaced drum closure panels, with paddles extending radially from the drums and secured by braces located inside the drums.

Various patents which detail helical propeller and paddle wheel configurations are as follows: U.S. Pat. No. Re 995; U.S. Pat. No. 5,000; U.S. Pat. No. 640,344; U.S. Pat. No. 18,694; U.S. Pat. No. 179,521; U.S. Pat. No. 1,820,866.

It is an object of this invention to provide a new and improved rake assembly and compactor for compacting and unloading aquatic growth deposited on the deck of an aquatic harvester and maintaining the aquatic harvester on an even keel during both the loading and unloading operations.

Another object of the invention is to provide a new and improved paddle wheel system for an aquatic harvester, which paddle wheel system consists of a pair of independently mounted, helical paddle wheels secured to the stern of an aquatic harvester, each of which paddle wheels is independently driven by a separate hydraulic or electric motor and is characterized by a pair of spaced blade plates, with multiple helical paddles extending radially outwardly therefrom.

Yet another object of this invention is to provide a new and improved rake assembly or compactor for compacting, organizing and unloading aquatic vegetation deposited on the deck of an aquatic harvester by a harvesting mechanism, which compactor is characterized by easy maintenance and eliminates the need for a long conveyor bed or large loading apron and includes a movable carriage or trolley driven by a pair of spaced, parallel, endless chains and provided with a shaft-mounted gearbox and motor for rotatably and pivotally operating a rake and causing the rake to selectively engage, compact and disengage the harvested aquatic vegetation.

A still further object of the invention is to provide a new and improved helical paddle wheel system for an aquatic harvester, which system includes a pair of independently-mounted and independently-driven helical paddle wheels situated in side-by-side relationship on the stern of the aquatic harvester to effect high maneuverability and efficient aquatic harvester operation.

A still further object of this invention is to provide a new and improved compactor and paddle wheel system for an aquatic harvester, which compactor includes a carriage or trolley mounted on parallel rails above the deck of the aquatic harvester and connected to and selectively driven in both directions by a pair of parallel, endless chain drives connected to a powered drive shaft and a one-piece member or rake rotatably and pivotally mounted on the carriage and fitted with separate teeth for selective engagement, compacting and unloading of aquatic growth on the harvester deck. The helical paddle wheel system includes a pair of independently driven helical paddle wheels mounted at the stern of the harvester and capable of independent operation by means of hydraulic or electric motors to power and control the harvester.

SUMMARY OF THE INVENTION

These and other objects of the invention are realized in an improved rake assembly, compactor and paddle wheel system for an aquatic harvester, which rake assembly and compactor is further characterized by a rail-mounted trolley that is movable in two directions on parallel rails elevated from the deck of an aquatic harvester by operation of a pair of coordinated, parallel endless chain drives connected to the trolley and a rake pivoted to the trolley and designed to engage, relocate, compact and unload aquatic vegetation harvested and stacked on the deck of the aquatic harvester. The helical paddle wheel system includes a pair of independently-driven and independently-controlled helical paddle wheels mounted in side-by-side relationship, each of the paddle wheels further including a pair of spaced, round blade plates adapted for receiving multiple, helically-shaped paddle blades to facilitate maximum maneuverability and efficiency in operating the aquatic harvester.

BRIEF DESCRIPTION OF THE DRAWINGS

The invention will be better understood by reference to the accompanying drawings, wherein:

FIG. 1 is a perspective view of an aquatic harvester with the compactor and dual helical paddle wheels of this invention mounted thereon;

FIG. 2 is an enlarged sectional view of rake and carriage elements of the aquatic harvester, taken along line 2—2 in FIG. 1;

FIG. 3 is an enlarged sectional view of rake and carriage elements of the aquatic harvester, taken along line 3—3 in FIG. 1;

FIG. 4 is a perspective detail of a typical chain support element of the hydraulic harvester taken along line 4—4 as illustrated in FIG. 1;

FIG. 6 is an enlarged sectional detail of chain and chain mount plate elements of the aquatic harvester illustrated in FIG. 1;

FIG. 8 is a side view of the aquatic harvester illustrated in FIG. 1;

DESCRIPTION OF THE PREFERRED EMBODIMENTS

Figure 5:
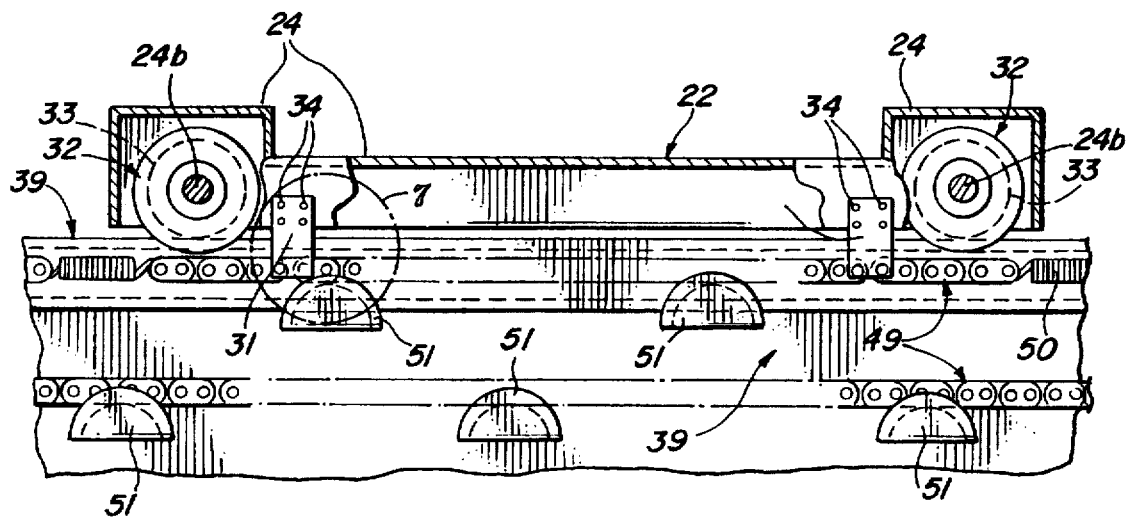
FIG. 5 is a side sectional view of the harvester chain and trolley mechanism.

Referring initially to FIGS. 1–3 and 9 of the drawings, an aquatic harvester is generally illustrated by reference numeral 1, floating on a water body 12 and the compactor element of the aquatic harvester 1 is illustrated by reference numeral 13. The compactor 13 is further characterized by a rake 14, which includes a mount bar 17, spanning the width of the flat deck 3 and multiple teeth 15 attached to the mount bar 17 and deployed downwardly in spaced, parallel relationship, to engage harvested aquatic vegetation (not illustrated) which accumulates on the deck 3, as hereinafter described. The aquatic harvester 1 is further provided with a pair of pontoons 4 and a wheelhouse 6, from which the aquatic harvester 1 is operated by manipulation of hydraulic controls 11. An inclined loading apron 7 is pivotally attached to an apron mount 7b and is raised and lowered by manipulating the hydraulic controls 11 to facilitate operation of an apron cylinder 7a and vertical and horizontal cutter blades 10, located on corresponding cutter bars 9, to cut aquatic vegetation growing in the water body 12, which vegetation is, in turn, loaded onto the deck 3 by means of a conveyor belt 8, provided on the loading apron 7. A backstop 19 is vertically mounted on the rear of the deck 3 and extends between the spaced, parallel wheel rails 39, bordering the deck 3, to facilitate compressing and compacting the aquatic plants, as hereinafter more particularly described.

Figure 7:
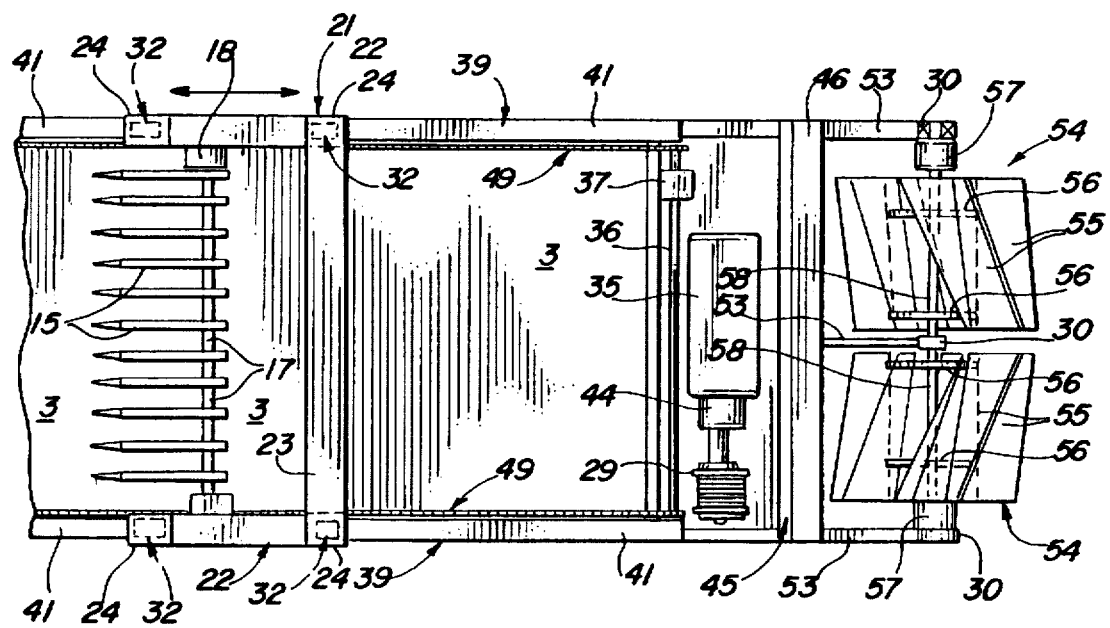
FIG. 7 is a top view, partially in section, of the middle and rear portions of the aquatic harveter illustrated in FIG. 1, including the helical paddle wheels.

Referring now to FIGS. 1, 7 and 8, the aquatic harvester 1 is driven by a pair of helical paddle wheels 54, mounted in side-by-side relationship and operated by separate paddle wheel drive motors 57, each typically hydraulically operated and energized by a common hydraulic pump 44 and hydraulic controls 11 and mounted on separate paddle wheel shafts 58, both of which are rotatably secured to spaced, parallel paddle wheel mounts 53, extending rearwardly from the deck 3. In a preferred embodiment, the outside ends of the paddle wheel shafts 58 are each independently journalled for rotation in a separate bearing 30 and receive a pair of spaced, round blade plates 56, which mount multiple blade supports 59, that carry the helical blades 55 in spaced, radial relationship. The opposite ends of the paddle wheel shafts 58 are mounted in a third common bearing 30. Accordingly, it will be appreciated that when the helical paddle wheels 54 drive the aquatic harvester 1 forward through a body of aquatic growth, the cutter blades 10 operate to cut the aquatic vegetation beneath the surface of the water body 12 and as the cut or floating plant material is deposited on the conveyor belt 8 of the loading apron 7, it is moved successively rearwardly on the deck 3 for compacting by the compactor 13, as hereinafter more particularly described.

Figure 9:
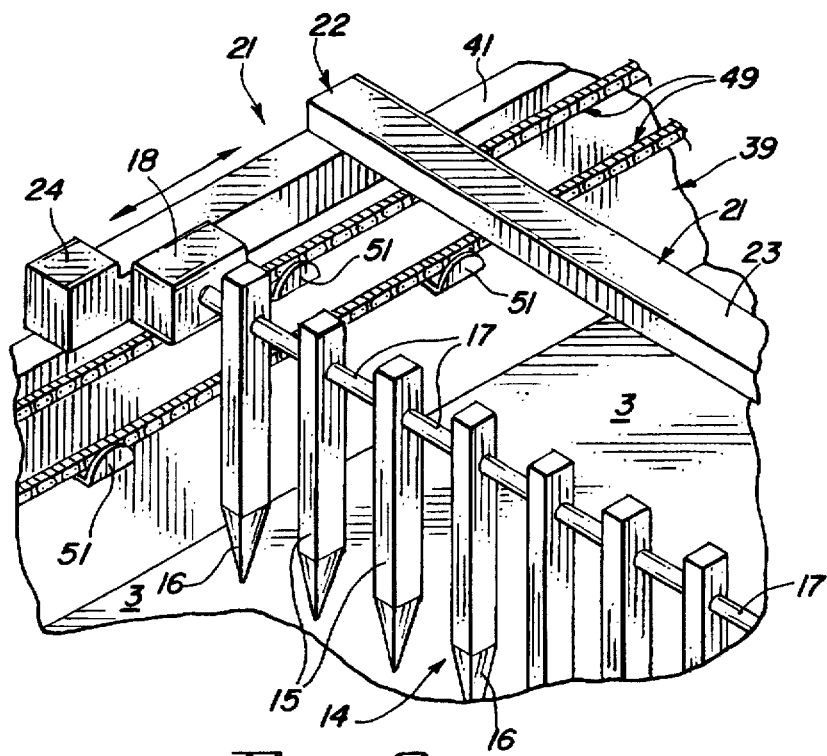
FIG. 9 is a perspective view, partially in section, of a preferred rake assembly construction in the aquatic harvester illustrated in FIG. 1.
Figure 10:
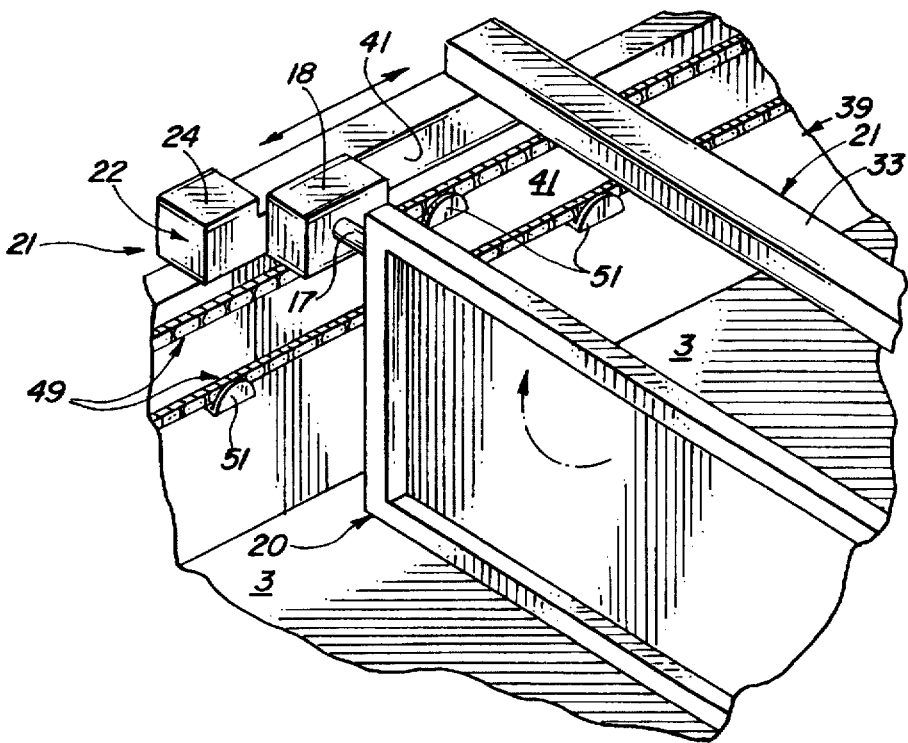
FIG. 10 is a perspective view, partially in section, of an alternative preferred rake assembly construction.

Referring now to FIGS. 1–3 and 7 of the drawings, a trolley 21 is disposed above the deck 3 of the aquatic harvester 1 and is characterized by a trolley frame 22, having a crossmember 23, connecting parallel wheel mounts 24. A pair of wheels 32 are mounted on corresponding wheel shafts 24b, seated in mount bearings 24a, in linearly-spaced relationship in each of the wheel mounts 24 and the wheels 32 are each characterized by spaced wheel flanges 33, as illustrated in FIG. 3, for spanning the top wheel rail flange 41 of each of the wheel rails 39, which are shaped to define a channel member and are supported by vertically-oriented, spaced spacer supports 40. A rake drive 2 includes a rake hydraulic rotary actuator or gearbox 18, which is mounted on the starboard wheel mount 24, as illustrated in FIGS. 3, 9 and 10, and receives one end of the mount bar 17, the other end of which mount bar 17 is rotatably mounted in the opposite, or port wheel mount 24. As heretofore described, the teeth 15 of the rake 14 project from the mount bar 17 in spaced relationship and are provided with tapered tips 16, as illustrated in FIG. 3.

As further illustrated in FIG. 1, under circumstances where a hydraulic drive and operating system is used, a hydraulic feed line 25 is coiled on a feed line reel 29 and is connected to the hydraulic fluid motor 44, operably connected to the engine 35, and terminates at the rake hydraulic gearbox 18. A hydraulic return line 26 is also wound on the feed line reel 29 and extends between the rake hydraulic gearbox 18 and the hydraulic fluid motor 44. Accordingly, in this system hydraulic fluid is pumped by operation of the hydraulic controls 11 and the hydraulic fluid motor 44, through the hydraulic feed line 25 to the rake hydraulic gearbox 18 and from the rake hydraulic gearbox 18 back to the hydraulic fluid motor 44 through the hydraulic return line 26. Multiple hose supports 27 are located on the deck 3 for supporting the hydraulic feed line 25 and the hydraulic return line 26. Each of the hose supports 27 is characterized by an arcuate support surface 28, which both supports and guides the hydraulic feed line 25 and the hydraulic return line 26 in a linear configuration, as illustrated in FIG. 4. Accordingly, as the trolley 21 and rake 14 traverse the top wheel rail flanges 41 of each wheel rail 39 above the deck 3 of the aquatic harvester 1, the hydraulic feed line 25 and hydraulic return line 26 are caused to engage and retract from the respective hose supports 27 and thus maintain the hydraulic feed line 25 and hydraulic return line 26 in a linear disposition along the deck 3, away from the aquatic plant storage area.

Traversal of the trolley 21 and the rake 14 along the parallel wheel rails 39 is facilitated by a pair of endless chains 49, the top segments of which are each secured to the trolley frame 22 by means of attachment plates 31 and plate bolts 34, registering with corresponding bolt openings 34a, respectively, as illustrated in FIGS. 5 and 6. One end of each of the loops of the endless chains 49 is extended around a corresponding drive sprocket 42, respectively, located near the helical paddle wheels 54 of the aquatic harvester 1, and the opposite ends of the endless chains 49 are each extended around a separate, corresponding idler sprocket 47, respectively, located near the loading apron 7 of the aquatic harvester 1. The parallel, spaced drive sprockets 42 are connected by a drive shaft 36 and the drive shaft 36 extends through a drive shaft hydraulic gearbox 37, which is serviced by a hydraulic feed line and a hydraulic return (not illustrated). Accordingly, operation of the drive shaft hydraulic gearbox 37 by manipulation of the hydraulic controls 11 and the hydraulic fluid motor 44 effects rotation of the drive shaft 36 and endless chains 49 in concert and causes the trolley 21 to traverse the wheel rails 39 in a selected direction which is determined by the direction of operation of the drive shaft 36. Multiple, spaced chain supports 51 are welded or otherwise attached to the wheel rails 39 beneath both the top and bottom segments of the endless chains 49, as illustrated in FIG. 5, to minimize sag in the chain segments. As in the case of the hose supports 27, the chain supports 51 are each characterized by recessed support surface (not illustrated), for maintaining the top and bottom chain segments of the endless chain 49 in a relatively linear disposition. As further illustrated in FIG. 5, coiled tensioning springs 50 are also provided in each of the loops of the endless chains 49 between the drive sprocket 42 and the idler sprocket 47, to maintain tension in the endless chains 49.

Referring again to FIGS. 1, 7 and 8 of the drawings, a hydraulic fluid reservoir and cooler 45 is provided on the deck 3 at the extreme rear of the aquatic harvester 1 immediately forward of the helical paddle wheels 54 and a water deflector 46 projects in angular relationship rearwardly from the top of the hydraulic fluid reservoir and cooler 45, for deflecting water splashed upwardly by the helical paddle wheels 54. The evaporating water cools the hydraulic fluid stored in the hydraulic fluid reservoir and cooler 45.

As illustrated in FIG. 10 of the drawings, in an alternative preferred embodiment of the invention a one-piece engaging plate 20 is mounted on the mount bar 17 for contacting and compacting the aquatic vegetation. It is understood that the one-piece engaging plate 20 is operated by the rake hydraulic gearbox 18 in the same manner as the teeth 15, illustrated in FIG. 9.

In operation, and referring initially again to FIGS. 1, 7 and 8 of the drawings, when it is desired to compact an accumulation of aquatic weeds or other marine vegetation (not illustrated) deposited by operation of the harvesting mechanism on the deck 3 of the aquatic harvester 1, the compactor 13 is employed. When the accumulation of aquatic growth on the deck 3 in an area beneath the wheelhouse 6 and between the loading apron 7 and backstop 19 is sufficiently large to require compaction, the drive shaft hydraulic gearbox 37 is initially operated by manipulating the hydraulic controls 11 to open selected valves (not illustrated), rotate the drive shaft 36, drive the endless chains 49 and cause the trolley 21 and the rake 14 to traverse the wheel rail flanges 41 of the wheel rails 39 in a forward direction and locate the trolley 21 and rake 14 at the front end of the aquatic harvester 1, near the loading apron 7. Since the teeth 15 (FIG. 1) or the one-piece engaging plate 20 (FIG. 10) of the rake 14 are initially positioned in a horizontal orientation, the rake hydraulic gearbox 18 is then operated by again manipulating the hydraulic control 11 to open other valves and pivot the tooth bar 17 and the teeth 15 or one-piece engaging plate 20 into a downward configuration for engagement with the aquatic growth. When the tapered tips 16 of the teeth 15 or the bottom edge of the one-piece engaging plate 20 are lowered in close proximity to the deck 3, the drive shaft hydraulic gearbox 37 is reversed and the aquatic growth is compacted as the trolley 21 and the rake 14 move rearwardly on the wheel rails 39. The trolley 21 is caused to continue its rearward movement toward the helical paddle wheels 54 to the maximum travel on the wheel rails 39, until the aquatic growth is tightly compacted between the rake 14 and the backstop 19. At this time, the rake hydraulic gearbox 18 is again operated by manipulating the hydraulic controls 11 to pivot the teeth 15 or the one-piece engaging plate 20 upwardly in a horizontal configuration, so that the trolley 21 and the rake 14 are ready for another compacting cycle, as harvested aquatic vegetation continues to accumulate on the deck 3 forwardly of the rake 14. This operation is continued until aquatic growth is compacted in a mass across the entire deck 3 and further compaction is no longer possible. Accordingly, when additional accumulations of harvested aquatic growth are deposited on the deck 3 beneath the wheel house 6, the procedure is repeated, with successive rearward movements of the trolley 21 and rake 14 effecting compacting of the aquatic growth removed from the loading apron area by the compactor 13. When the accumulated aquatic growth has been compacted to the maximum extent against the backstop 19 and the trolley 21 can not be moved farther rearwardly to effect additional compaction because of the volume of aquatic growth accumulated on the deck 3, the aquatic harvester 1 is maneuvered to the shore. The loading apron 7 is then positioned on shore, the conveyor belt 8 reversed and the compactor 13 operated as described above, except in reverse, to push the compacted aquatic growth onto the conveyor belt 8 for unloading on shore. Accordingly, it will be appreciated by those skilled in the art that the procedure for unloading the aquatic growth is a reverse of the procedure heretofore described for compacting the aquatic growth, with the trolley 21 moved initially rearwardly to maximum travel, the rake 14 pivoted into a downward-engaging configuration by operation of the rake hydraulic gearbox 18 to a point immediately forward of the backstop 19 and the trolley 21 moved forwardly toward the wheel house 6, to force the aquatic growth onto the conveyor belt 8 of the loading apron 7. Since linear movement of the trolley 21 along the wheel rail flanges 41 of the wheel rails 39 can be closely controlled by the operator, the aquatic growth can be both compacted and unloaded at a controlled rate which is adjusted to the rate of operation of the conveyor belt 8 in the loading apron 7. It will be further appreciated that the compactor 13 is used to periodically relocate and compact the vegetation and thereby maintain an essentially equal weight distribution of the harvested aquatic product on the deck 3 of the aquatic harvester 1. This balancing of the aquatic plant load is important to prevent the aquatic harvester 1 from settling at the bow and raising the helical paddle wheels 54 entirely from the water body 12.

Referring now to FIGS. 1 and 8 of the drawings, the maneuverability of the aquatic harvester 1 through beds of aquatic vegetation in selected paths with the cutter bar 9 positioned at various cutting depths is easily facilitated by operation of the apron cylinder 7a, which operates the loading apron 7, and the twin helical paddle wheels 54. Precise location of the aquatic harvester 1 in a desired cutting orientation can be achieved by operating one or both of the helical paddle wheels 54 independently of each other, since both helical paddle wheels 54 are separately driven by the independent paddle wheel drive motors 57 to align the aquatic harvester 1 in a desired path. Maximum speed is achieved by operating both helical paddle wheels 54 in the forward or reverse direction simultaneously, while directional movement is controlled by operating one of the helical paddle wheels 54, either at a higher speed, or independently of the other. Turning of the aquatic harvester on its own axis is possible by operating one of the helical paddle wheels 54 in one direction and the second helical paddle wheel 54 in the opposite direction. Since the helical blades 55 of the helical paddle wheels 54 extend to a depth of only about six inches to one foot into the water body 12, movement of the aquatic harvester 1 through thick beds of aquatic growth is easily facilitated with maximum efficiency and maneuverability. It has been found that under circumstances where the aquatic harvester 1 must be maneuvered through such thick beds of aquatic vegetation, additional strain is placed on the conventional paddle wheels because of repetitive contact between individual blades and the aquatic vegetation, in addition to the water which floats the aquatic harvester 1. However, this strain is minimized using the helical paddle wheels 54 because of the superior helical design, which allows stress to be transferred along the entire lengths of the helical blades 55, thereby minimizing the total stress on each of the helical blades 55 and facilitating a lighter paddle wheel drive system. However, it will be appreciated by those skilled in the art that although the helical paddle wheel design is preferred, conventional paddle wheels such as the paddle wheels detailed in U.S. Pat. No. 4,507,909, can also be utilized in the aquatic harvester 1, along with the compactor 13 of this invention.

Referring again to FIGS. 1 and 8 of the drawings, one of the problems realized in the operation of conventional hydraulic motors is the cooling of hydraulic fluid used to operate such motors. Accordingly, as heretofore described, another important feature of this invention is the location of the hydraulic fluid reservoir and cooler 45 in close proximity to the helical paddle wheels 54 and shaping the hydraulic fluid reservoir and cooler 45 in a rectangular configuration which is upward-standing on the deck 3, in order to provide maximum surface area for cooling the hydraulic fluid located in the hollow interior of the hydraulic fluid reservoir and cooler 45. It will be appreciated that water which is retained on or splashed upwardly by the helical blades 55 of the helical paddle wheels 54 impinges on the hydraulic fluid reservoir and cooler 45 and cools the enclosed hydraulic fluid. The location of the hydraulic fluid reservoir and cooler 45 in such close proximity to the helical paddle wheels 54 has proved to be a very efficient means of cooling hydraulic fluid used to operate the various hydraulic fluid motors in the aquatic harvester 1. Alternatively, it will be appreciated by those skilled in the art that an electric drive system can be utilized to operate the aquatic harvester 1, as desired.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In an aquatic harvester having a deck, pontoons disposed beneath the deck, a loading apron provided on one end of the deck and an aquatic vegetation cutter mounted on the loading apron, the improvement comprising a trolley characterized by a frame and wheels carried by said frame; rail means extending longitudinally along the deck in spaced relationship with respect to each other for receiving said wheels; a pair of endless chain drive means attached to said frames; and a mount bar rotatably carried by said frame; engaging means carried by said mount bar; and rake pivot means carried by said frame, said rake divot means engaging said mount bar for selectively rotating said mount bar and pivoting said engaging means and positioning said engaging means for engaging and disengaging the aquatic vegetation deposited on the deck by the loading apron and selectively moving the aquatic vegetation on the deck responsive to operation of said inlet chain drive means and controlled traversal of said rail means selectively in a forward and reverse direction by said trolley.

2. The aquatic harvester of claim 1 wherein said endless chain drive means further comprises a pair of endless chains disposed in spaced, parallel relationship adjacent to said rail means, respectively; a pair of drive sprockets engaging one end of said endless chains in spaced relationship; a drive shaft connecting said drive sprockets; shaft drive means engaging said drive shaft for selectively driving said drive sprockets in either direction; and a pair of idler sprockets carrying the opposite ends of said drive chains.

3. The aquatic harvester of claim 1 wherein said wheels are further characterized by a first pair of wheels having spaced first wheel flanges, said first pair of wheels located on one side of said frame and said spaced first wheel flanges engaging one of said rail means and a second pair of wheels having spaced second wheel flanges, said second pair of wheels located on the opposite side of said frame from said first pair of wheels, said spaced second wheel flanges engaging the other of said rail means.

4. The aquatic harvester of claim 1 wherein:

(a) said endless chain drive means further comprise a pair of endless chains disposed in spaced, parallel relationship adjacent to said rail means, respectively; a pair of drive sprockets engaging one end of said endless chains in spaced relationship; a drive shaft connecting said drive sprockets; shaft drive means engaging said drive shaft for driving said drive sprockets in either direction; and a pair of idler sprockets aligned with said drive sprockets, respectively, for engaging the opposite ends of said drive chains; and (b) said wheels are further characterized by a first pair of wheels having spaced first wheel flanges, said first pair of wheels located on one side of said frame and said spaced first wheel flanges engaging one of said rail means and a second pair of wheels having spaced second wheel flanges, said second pair of wheels located on the opposite side of said frame from said first pair of wheels, said spaced second wheel flanges engaging the other of said rail means.

5. The aquatic harvester of claim 1 wherein said engaging means further comprises a plurality of teeth fixedly disposed on said mount bar in spaced, substantially parallel relationship.

6. The aquatic harvester of claim 1 wherein said engaging means further comprises a one-piece member fixedly carried by said mount bar.

7. The aquatic harvester of claim 1 further comprising a pair of helical paddle wheels rotatably carried by the opposite end of the deck from the loading apron, said, helical paddle wheels positioned in side-by-side relationship and characterized by a plurality of helical blades disposed in radially spaced relationship.

8. The aquatic harvester of claim 7 wherein:

(a) said endless chain drive means further comprise a pair of endless chains disposed in spaced, parallel relationship adjacent to said rail means, respectively; a pair of drive sprockets engaging one end of said endless chains in spaced relationship; a drive shaft connecting said drive sprockets; shaft drive means engaging said drive shaft for driving said drive sprockets in either direction; and a pair of idler sprockets aligned with said drive sprockets, respectively, for engaging the opposite ends of said drive chains; and (b) said wheels are further characterized by a first pair of wheels having spaced first wheel flanges, said first pair of wheels located on one side of said frame and said spaced first wheel flanges engaging one of said rail means and a second pair of wheels having spaced second wheel flanges, said second pair of wheels located on the opposite side of said frame from said first pair of wheels, said spaced second wheel flanges engaging the other of said rail means.

9. The aquatic harvester of claim 8 wherein said engaging means further comprises a plurality of teeth disposed on said mount bar in spaced, substantially parallel relationship.

10. The aquatic harvester of claim 8 wherein said engaging means further comprises a one-piece member carried by said mount bar.

11. The aquatic harvester of claim 7 further comprising separate drive means provided on each of said helical paddle wheels for independently driving each of said helical paddle wheels.

12. The aquatic harvester of claim 11 wherein:

(a) said endless chain drive means further comprises a pair of endless chains disposed in spaced, parallel relationship adjacent to said rail means, respectively; a pair of drive sprockets engaging one end of said endless chains in spaced relationship; a drive shaft connecting said drive sprockets; shaft drive means engaging said drive shaft for selectively driving said drive sprockets in either direction; and a pair of idler sprockets carrying the opposite ends of said drive chains; and (b) said wheels are further characterized by a first pair of wheels having spaced first wheel flanges, said first pair of wheels located on one side of said frame and said spaced first wheel flanges engaging one of said rail means and a second pair of wheels having spaced second wheel flanges, said second pair of wheels located on the opposite side of said frame from said first pair of wheels, said spaced second wheel flanges engaging the other of said rail means.

13. In an aquatic harvester having a generally rectangular shaped deck; pontoons disposed beneath the deck; a loading apron pivotally secured to one end of the deck and a cutter assembly carried by the loading apron, the improvement comprising a trolley characterized by a frame; wheels rotatably carried by said frame; a pair of rails extending longitudinally along the deck in spaced relationship for receiving said wheels in rolling relationship; a pair of endless chain drive means carried by said rails and attached to said frame in driving relationship, wherein said wheels are selectively caused to traverse said rails in a forward and reverse direction along the deck responsive to movement of said endless chain drive means; a mount bar rotatably attached to said frame in spaced relationship; and a plurality of teeth extending from said mount bar in spaced relationship, wherein said mount bar is caused to rotate with respect t6 said frame to raise and lower said teeth responsive to forward and reverse operation of said trolley; and a pair of helical paddle wheels rotatably extending from the opposite end of the deck from the loading apron and positioned in side-by-side relationship, each of said helical paddle wheels characterized by a shaft, a pair of blade plates mounted on said shaft and a plurality of helical paddles mounted on said blade plates in radially spaced relationship.

14. The aquatic harvester of claim 13 wherein said endless chain drive means further comprise a pair of endless chains disposed in spaced, parallel relationship adjacent to said rail means, respectively; a pair of drive sprockets engaging one end of said endless chains in spaced relationship; a drive shaft connecting said drive sprockets; shaft drive means engaging said drive shaft for selectively driving said drive sprockets in either direction; and a pair of idler sprockets carrying the opposite ends of said drive chains.

15. The aquatic harvester of claim 14 wherein said wheels are further characterized by a first pair of wheels having spaced first wheel flanges, said first pair of wheels located on one side of said frame and said spaced first wheel flanges engaging one of said rail means and a second pair of wheels having spaced second wheel flanges, said second pair of wheels located on the opposite side of said frame from said first pair of wheels, said spaced second wheel flanges engaging the other of said rail means.

16. The aquatic harvester of claim 15 wherein said engaging means further comprises a plurality of teeth fixedly disposed on said mount bar in spaced, substantially parallel relationship.

17. The aquatic harvester of claim 15 wherein said engaging means further comprises a one-piece member fixedly carried by said mount bar.

* * * * *